(12) United States Patent
Zwerger et al.

(10) Patent No.: US 11,885,401 B2
(45) Date of Patent: Jan. 30, 2024

(54) TRANSMISSION

(71) Applicant: ZF Friedrichshafen AG, Friedrichshafen (DE)

(72) Inventors: Niko Zwerger, Friedrichshafen (DE); Michael Obergasser, Friedrichshafen (DE); Steffen Barth, Amtzell (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/641,379

(22) PCT Filed: Jul. 25, 2018

(86) PCT No.: PCT/EP2018/070083
§ 371 (c)(1),
(2) Date: Feb. 24, 2020

(87) PCT Pub. No.: WO2019/038002
PCT Pub. Date: Feb. 28, 2019

(65) Prior Publication Data
US 2020/0191253 A1    Jun. 18, 2020

(30) Foreign Application Priority Data
Aug. 24, 2017   (DE) .................. 10 2017 214 847

(51) Int. Cl.
*F16H 57/027*   (2012.01)
*F16H 57/04*    (2010.01)

(52) U.S. Cl.
CPC ......... *F16H 57/027* (2013.01); *F16H 57/046* (2013.01); *F16H 57/0423* (2013.01); *F16H 57/0473* (2013.01)

(58) Field of Classification Search
CPC .. F16H 57/027; F16H 57/0423; F16H 57/046; F16H 57/0473
See application file for complete search history.

(56) References Cited

U.S. PATENT DOCUMENTS 3,003,659 A * 10/1961 Miller .................. F16H 57/027
220/722
3,145,582 A * 8/1964 Wagner ................ F16H 57/027
74/606 R
(Continued)

FOREIGN PATENT DOCUMENTS

DE    102008040013 A1 * 12/2009 ............. F16H 48/11
DE    102014112280 A1    3/2015
(Continued)

OTHER PUBLICATIONS

Machine Translation of DE 102008040013 A1 (Year: 2009).*
(Continued)

*Primary Examiner* — Thomas C Diaz
(74) *Attorney, Agent, or Firm* — Dority & Manning, P.A.

(57) ABSTRACT

A dual clutch transmission (1) includes a breather assembly (7) with a breather element (9). The breather element (9) includes at least one entry opening (24) facing a transmission interior and an outwardly facing exit opening (40). The breather assembly (7) also includes at least one oil collection element (8) arranged between the breather element (9) and an oil spray source (6).

16 Claims, 6 Drawing Sheets

(56) References Cited

U.S. PATENT DOCUMENTS

| | | | | | |
|---|---|---|---|---|---|
| 4,222,283 | A | * | 9/1980 | Nagy | F16H 3/089 |
| | | | | | 184/11.2 |
| 4,351,203 | A | * | 9/1982 | Fukunaga | F16H 57/027 |
| | | | | | 137/540 |
| 2004/0231457 | A1 | * | 11/2004 | Miyazaki | F16H 63/3026 |
| | | | | | 74/665 R |
| 2015/0075322 | A1 | | 3/2015 | Vituri et al. | |

FOREIGN PATENT DOCUMENTS

| | | | |
|---|---|---|---|
| DE | 102014204906 A1 | 9/2015 | |
| DE | 102014215203 A1 | 2/2016 | |
| DE | 102018201898 A1 * | 8/2019 | F16H 57/04 |
| JP | S57153865 U | 9/1982 | |
| JP | 2000346181 A | 12/2000 | |

OTHER PUBLICATIONS

International Search Report (English Translation) PCT/EP2018/070083, dated Sep. 14, 2018. (3 pages).
WO Search Report PCT/EP2018/070083, dated Sep. 26, 2018. (18 pages).

* cited by examiner

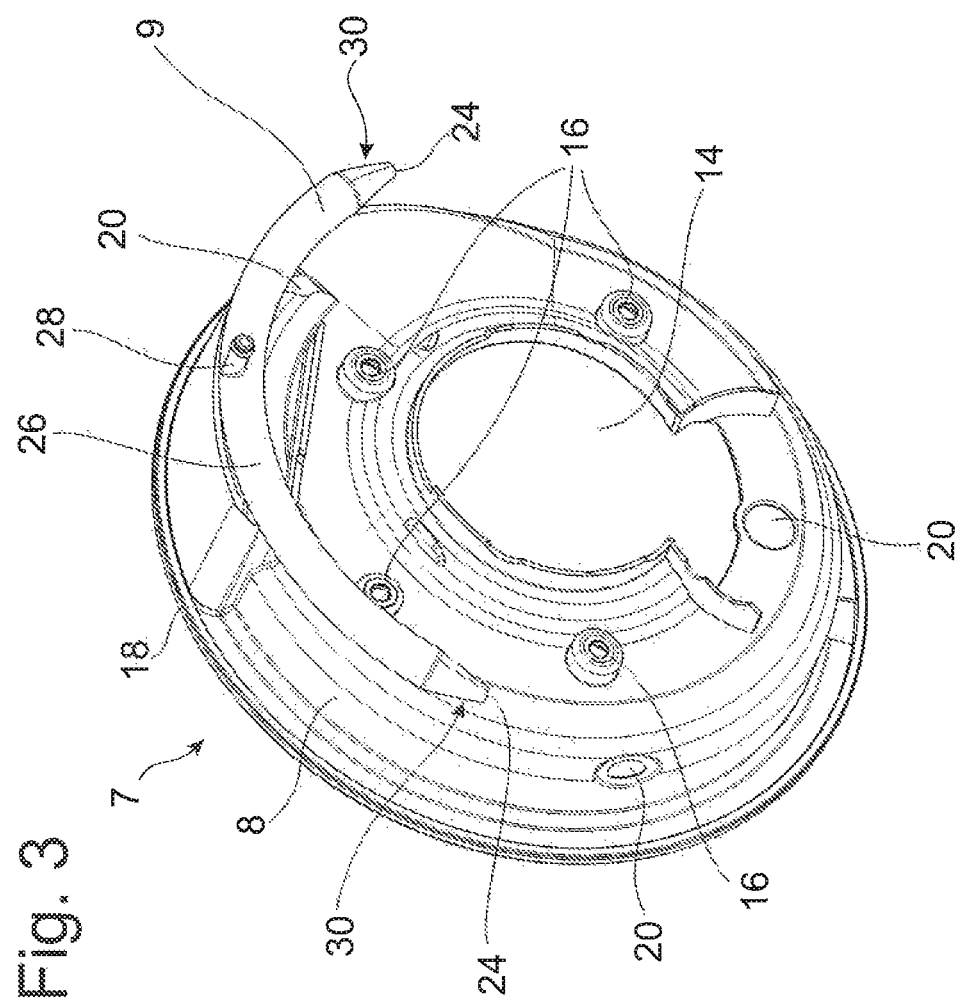

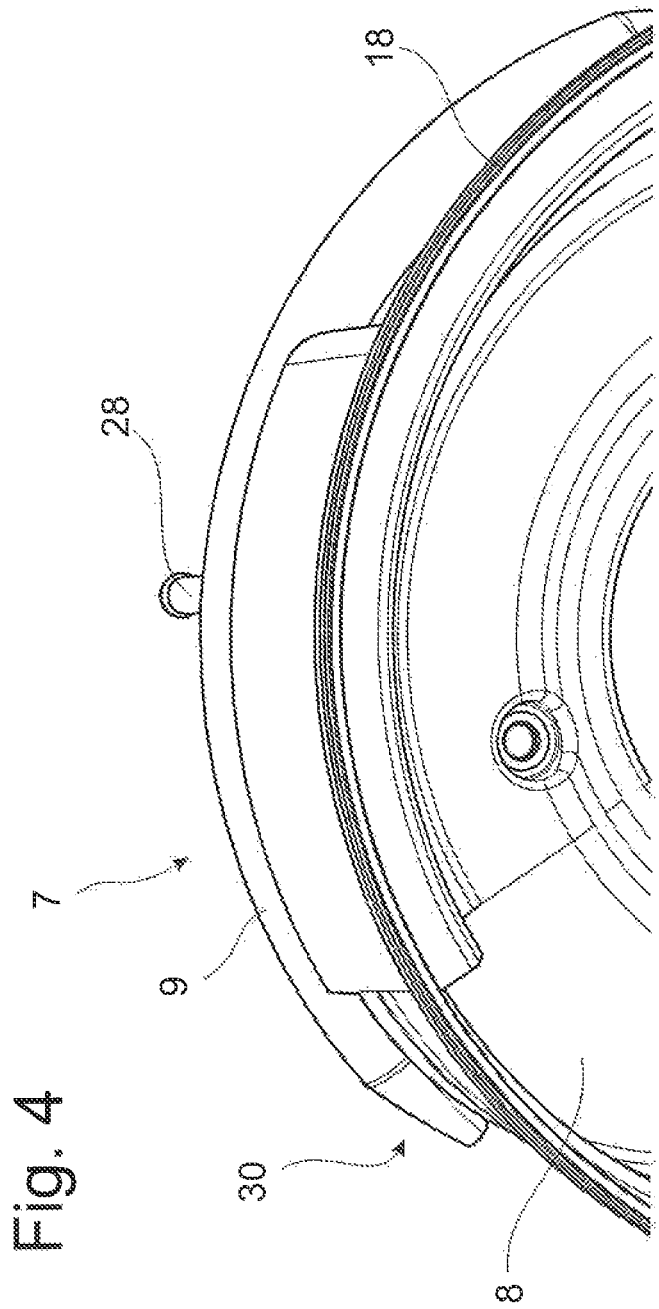

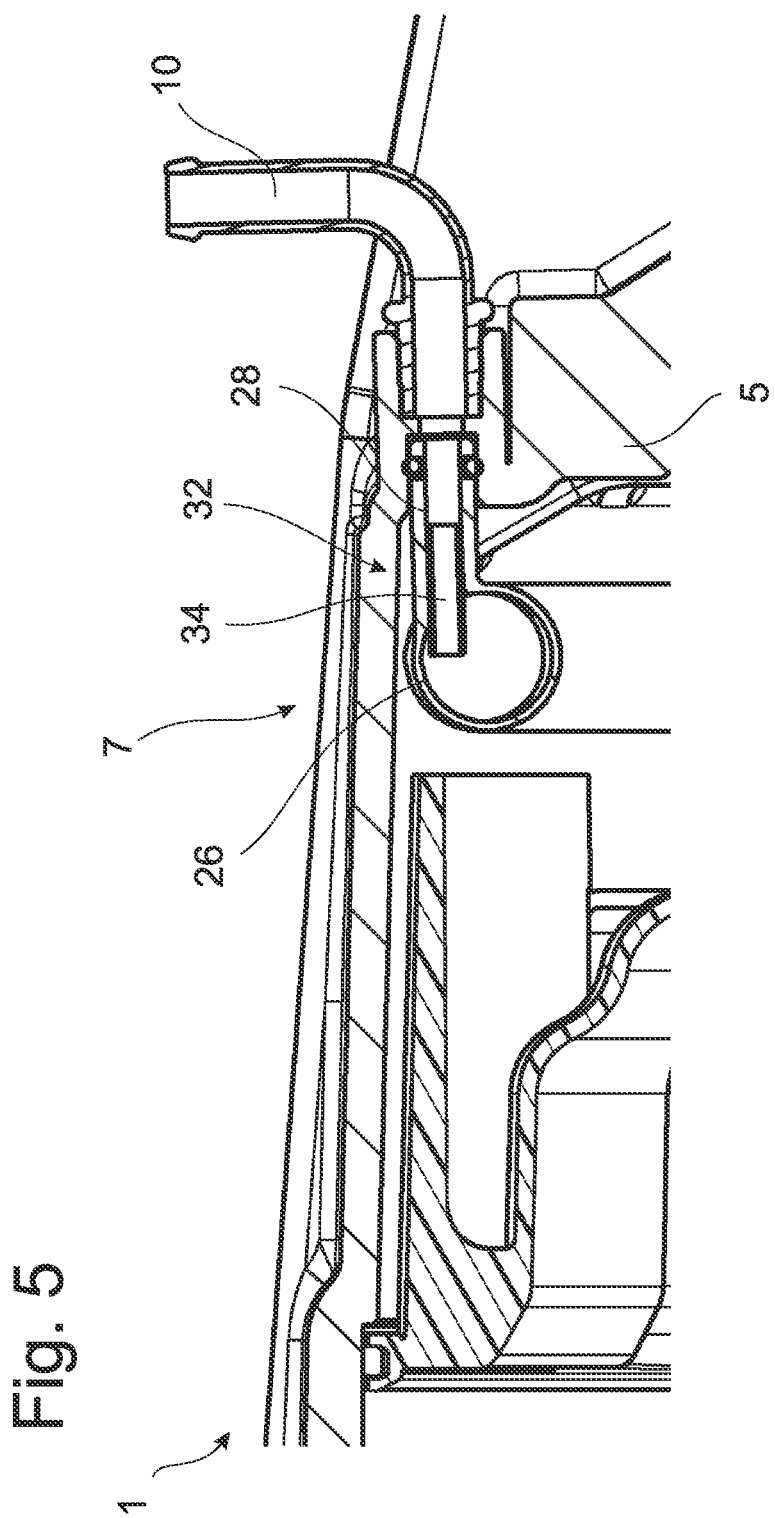

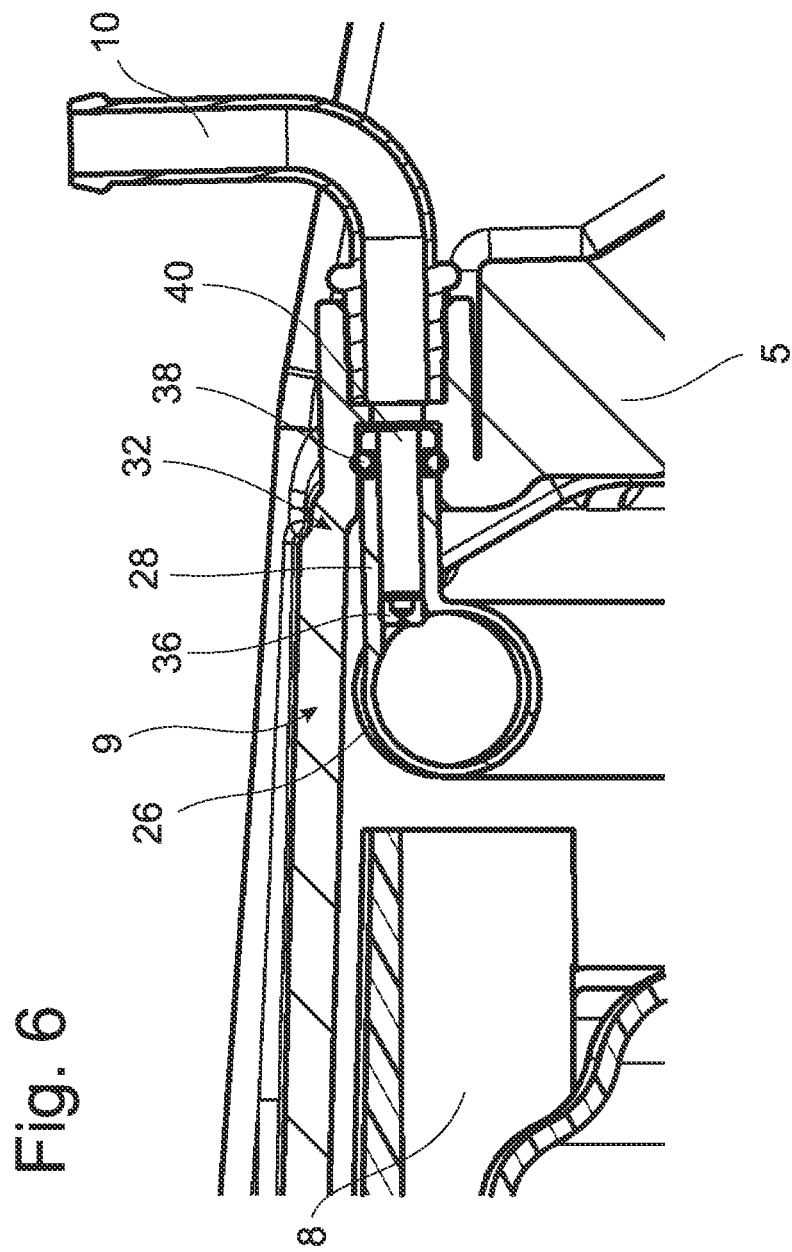

TRANSMISSION

CROSS-REFERENCE TO RELATED APPLICATION

The present application is related and has right of priority to International Application No. PCT/EP2018/070083 filed on Jul. 25, 2018 and to German Patent Application No. 10 2017 214 847.0 filed on Aug. 24, 2017, both of which are incorporated by reference in their entirety for all purposes.

FIELD OF THE INVENTION

The invention relates generally to a transmission, in particular a dual clutch transmission, that includes a breather assembly with a breather element, which includes at least one entry opening facing the transmission interior and an outwardly facing exit opening.

BACKGROUND

In order to be able to bring about a pressure compensation during fluctuating temperatures in the transmission, it is known to provide an opening on the transmission housing, which is also referred to as a breather.

In sports cars having high torques, oil can be pressed through the breather opening. In order to avoid this, breather assemblies that are more complex are also known. DE 10 2014 215 203 A1 describes, for example, a breather assembly, which includes a T-shaped section and an adjoining line section. In addition, breather assemblies including a labyrinth are known.

A feature common to these structures is that, although they can slow down the leakage of oil from the transmission, they cannot entirely prevent oil leakage.

SUMMARY OF THE INVENTION

On the basis thereof, example aspects of the present invention provide a transmission that includes a breather assembly, out of which no transmission oil leaks, even during extreme driving situations.

In order to solve this problem, the breather assembly includes at least one oil collection element, which is arranged between the breather element and a source of oil spray.

As described, the breather element includes at least one entry opening and one exit opening. Air, oil foam, and oil spray enter the breather element through the entry opening and only air is to exit through the exit opening. This applies when there are higher temperatures and pressures in the transmission interior than in the exterior space. In the opposite case, air enters the transmission through the exit opening and via the entry opening. This case is unproblematic, since the air flow forces the oil back into the transmission.

The term "entry" opening therefore designates only the position of the opening toward the transmission interior, while the exit opening designates an opening toward the space surrounding the transmission. It has been shown that even complicated breather structures cannot prevent an oil leak out of the transmission, but rather can only slow leakage down. In order to be able to completely prevent an oil leak, an oil collection element is therefore provided, which is arranged between the breather element and a source of oil spray. The breather element is therefore shielded in such a way that the amount of oil entering the breather element is only as small as the amount that the breather element can prevent from escaping.

In principle, the breather element can be designed in the same manner as a known breather element. A breather element optimized for the described assembly is also presented further below, however. First of all, it is essential that the breather element is shielded from oil spray by an additional oil collection element.

Sources of oil spray can be clutches, gearwheels, or any other rotating components in the transmission. In the case of dual clutch transmissions, this can be a clutch of the dual clutch and/or gearwheels of the gear set or the transmission shafts. At high rotational speeds, the oil spray adds up to a type of oil flow, which is why the described breather elements alone do not succeed in completely preventing the amounts of oil entering the breather element from leaking.

Instead of further optimizing the breather elements as done previously, the new approach is utilized, namely ensuring that oil spray does not even reach the breather element in the first place, whereby the breather element also no longer needs to accommodate as large amounts of oil as before. Due to the described assembly, a complete or 100-percent partitioning-off of the breather element is not achieved. The amount of oil entering the breather element can be reduced, however, in such a way that it is unproblematic. In particular, no more oil leaks out of the transmission interior. Instead, the oil entering the breather element can be completely guided out of the breather element. In this case, oil that is entering is considered to be oil in droplet form as well as oil foam.

Advantageously, the breather assembly can be arranged in the clutch bell housing. Alternatively, the breather assembly can be arranged in the gear set housing. The transmission housing usually essentially includes two components, namely the clutch bell housing accommodating the clutch, and the gear set housing. Due to the space conditions, the breather assembly is usually arranged in the gear set housing. In the intended use of the oil collection element, an arrangement in the clutch bell housing has proven to be a further alternative.

Advantageously, the oil collection element can have a circular cross-section. The oil collection element can also include passages for transmission components. In particular, the oil collection element can have an annular cross-section. In that case, the transmission input shafts can extend through the oil collection element.

Advantageously, the oil collection element can be designed to be cylindrical or pot-shaped and/or have a circular cross-section. In that case, the oil spray is collected on the rim of the pot or at the bottom of the pot and is directed to the bottom of the oil collection element.

Advantageously, a sealing element can be located on the rim of the oil collection element, which seals the oil collection element with respect to the transmission interior.

Preferably, the oil collection element can be made at least partially of plastic. In particular, the oil collection element can be manufactured with the aid of plastic injection molding. This allows for a cost-effective manufacture of the oil collection element, which, with respect to shape, is mostly irregularly shaped.

Advantageously, the oil collection element can be arranged in such a way that it shields the breather element in an oil spray-tight manner. This means, it is not provided for creating a completely oil-tight space. It is intended to merely keep the oil spray away from the breather element. This is completely sufficient, however, since practically no more oil at all reaches the breather element.

This is implementable, in particular, when the oil collection element separates a space from the rest of the transmission interior. This can be, as described above, a space in the clutch bell housing or in the gear set housing. This space accommodates the breather and, therefore, can also be designated as the breather chamber. This breather chamber is shielded in an oil spray-tight manner. This means, oil as well as oil spray can definitely still enter the breather chamber. The openings of the oil collection element are arranged in such a way, however, that the oil or oil spray reaches the transmission wall or the wall of the breather element, but not the entry openings. If oil foam passes through the air passage openings of the oil collection element and accumulates in the breather chamber, oil can also enter the breather element. The breather element is designed for processing these small amount of oil, in that the oil foam is separated into oil and air and only the air can exit the breather element toward the outside. The oil is discharged into the transmission interior.

Advantageously, the oil collection element can include air passage openings exclusively in the lower half. Therefore, the oil spray can also enter the breather chamber only in the lower half of the oil collection element. Preferably, the breather element is arranged in the upper half of the oil collection element.

In addition, the passage openings or air passage openings of the oil collection element can be arranged spaced apart from the entry opening or entry openings of the breather element. In addition, the entry openings of the breather element can be arranged in such a way that oil that passes through the oil collection element does not directly impact the entry openings.

It can be provided that the breather element includes two entry openings and one exit opening. The entry openings are, as described above, the openings that face the transmission interior.

Advantageously, the breather element can be curved. In particular, it can be designed as a ring segment. Preferably, the breather element has an annular cross-section. It can also be designed, however, having a cross-section that is rectangular or any other shape. It is therefore shaped similarly to a banana.

Since, due to the oil collection element, the largest portion of the oil no longer reaches the breather element, the breather element can be designed to be simplified. The breather element includes, for example, only one base body, on which the two entry openings are arranged. This base body is designed to be curved or in the form of a ring segment. The multiple sections described in the prior art are no longer necessary.

In order to achieve a separation into oil and air when oil foam enters through one of the entry openings, it can be provided that the breather element has a variable cross-section. In particular, the cross-section can enlarge, at least in sections, toward the center. This can be implemented in various ways.

On the one hand, the ends of the breather element or of the base body of the breather element can taper. Therefore, there are merely smaller entry openings as compared to the cross-sectional area in the center. It can also be provided, however, that, starting from the entry openings, the cross-section enlarges considerably and the section extends across one-fifth the length of the base body. A ten-fold and even larger cross-sectional area can be achieved starting from an area of the entry opening. In that case, oil foam bubbles entering the base body of the breather element expand, whereby they burst and the oil reaches the bottom of the base body, while the air collects above the oil.

Advantageously, the entry opening or the entry openings of the breather element can face downward in the installation position. As a result, oil foam entering the breather element, which is condensed back into oil, can exit the breather element in a simple way. Where the openings are located is insignificant for the air, however.

Advantageously, the breather element can be arranged between the oil collection element and the transmission interior wall. Advantageously, the breather element can be arranged on the wall between the clutch bell housing and the gear set housing. The breather chamber is then located between the oil collection element and the intermediate wall of the transmission. In order to establish a connection to the space outside the transmission, the breather element can include a breather duct, which encompasses the exit opening and can be inserted the transmission interior wall, for example, the intermediate wall between the clutch bell housing and the gear set housing. In order to achieve a complete connection toward the outside, the breather assembly can include a connection piece, in particular a hose connection, toward the outside. This can be connected to the breather duct or simply inserted into the wall of the transmission.

In addition, an oil barrier can be located in the breather duct. The oil barrier can be designed as a pressed-in or integrally injection-molded baffle, which protrudes into the base body. It can also be designed as a baffle in the breather duct, however.

BRIEF DESCRIPTION OF THE FIGURES

Further advantages, features, and details of the invention result from the following description of exemplary embodiments and figures. Wherein:

FIG. 3 shows a breather assembly in a first view;
FIG. 4 shows a breather assembly in a second view;
FIG. 5 shows a breather assembly in a third view;
and
FIG. 6 shows a breather assembly in a fourth view.

DETAILED DESCRIPTION

Figure 1:
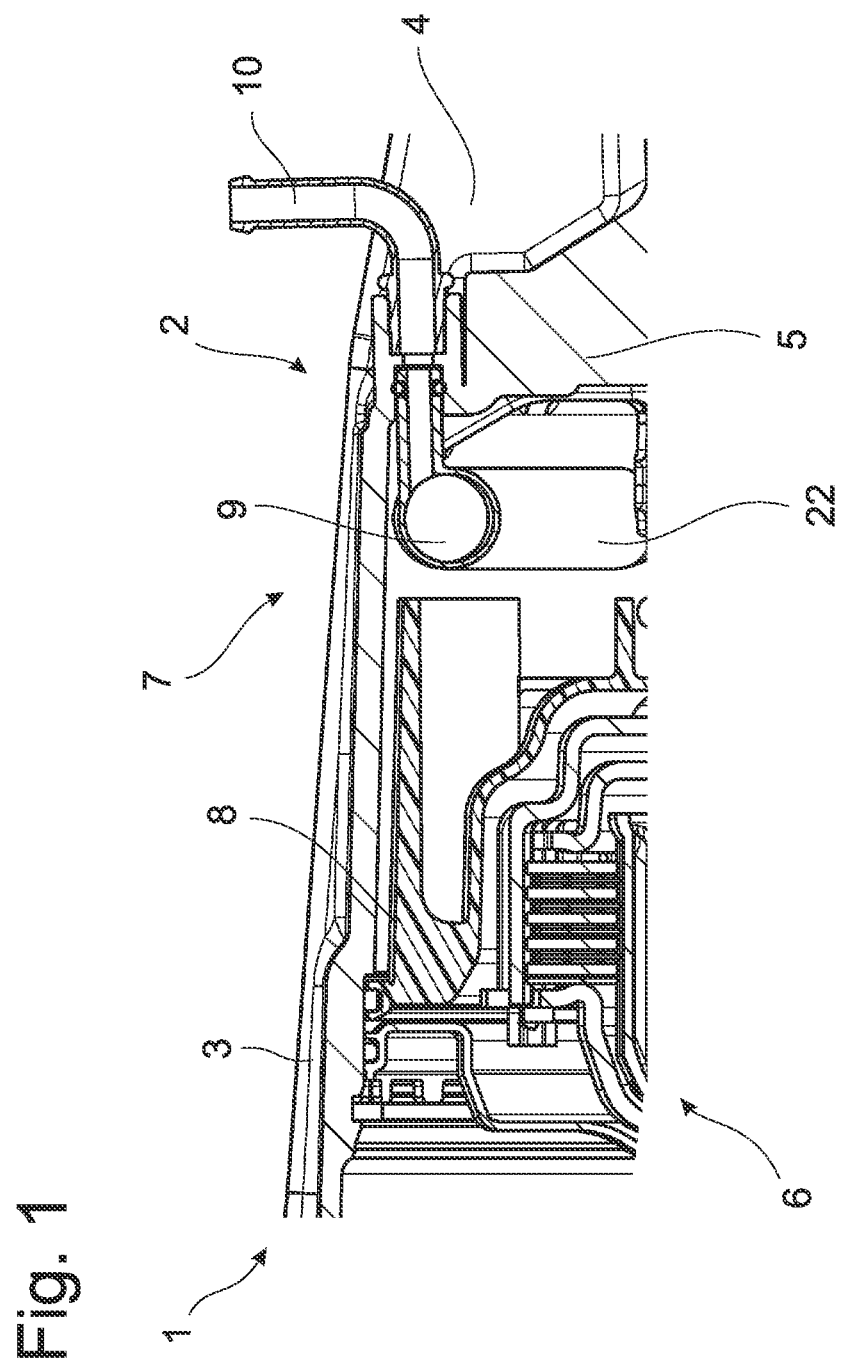
FIG. 1 shows a transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a transmission 1 including a transmission housing 2. The transmission housing 2 is split into a clutch bell housing 3 and the gear set housing 4. The gear set housing 4 is often also referred to as a transmission housing. This is ambiguous, however, at least when the clutch bell housing 3 is taken into account. In the present application, the transmission housing 2 is therefore understood to be the entirety of the transmission including the clutch bell housing 3 and the gear set housing 4. An intermediate wall 5 is located between the clutch bell housing 3 and the gear set housing 4. The intermediate wall 5 is utilized, for example, for mounting the transmission input shafts, which is why the intermediate wall 5 is also referred to as a bearing bracket.

The clutch assembly 6 of the transmission 1 is located in the clutch bell housing 3. Preferably, the transmission 1 can be designed as a dual clutch transmission. In that case, the clutch assembly 6 is designed, for example, as a dual clutch. In particular in the case of hybridized drive trains, the clutch assembly can also be designed as a triple clutch assembly. In that case, two clutches are powershift clutches of the dual clutch transmission and the third clutch is utilized for disconnecting the internal combustion engine from the rest of the drive train during electric motor-operated travel. Therefore, it is a separating clutch.

The breather assembly 7 is arranged in the clutch bell housing 3. The breather assembly 7 includes an oil collection element 8 and a breather element 9. The breather assembly 7 also includes a hose connection 10 toward the outside of the transmission.

Figure 2:
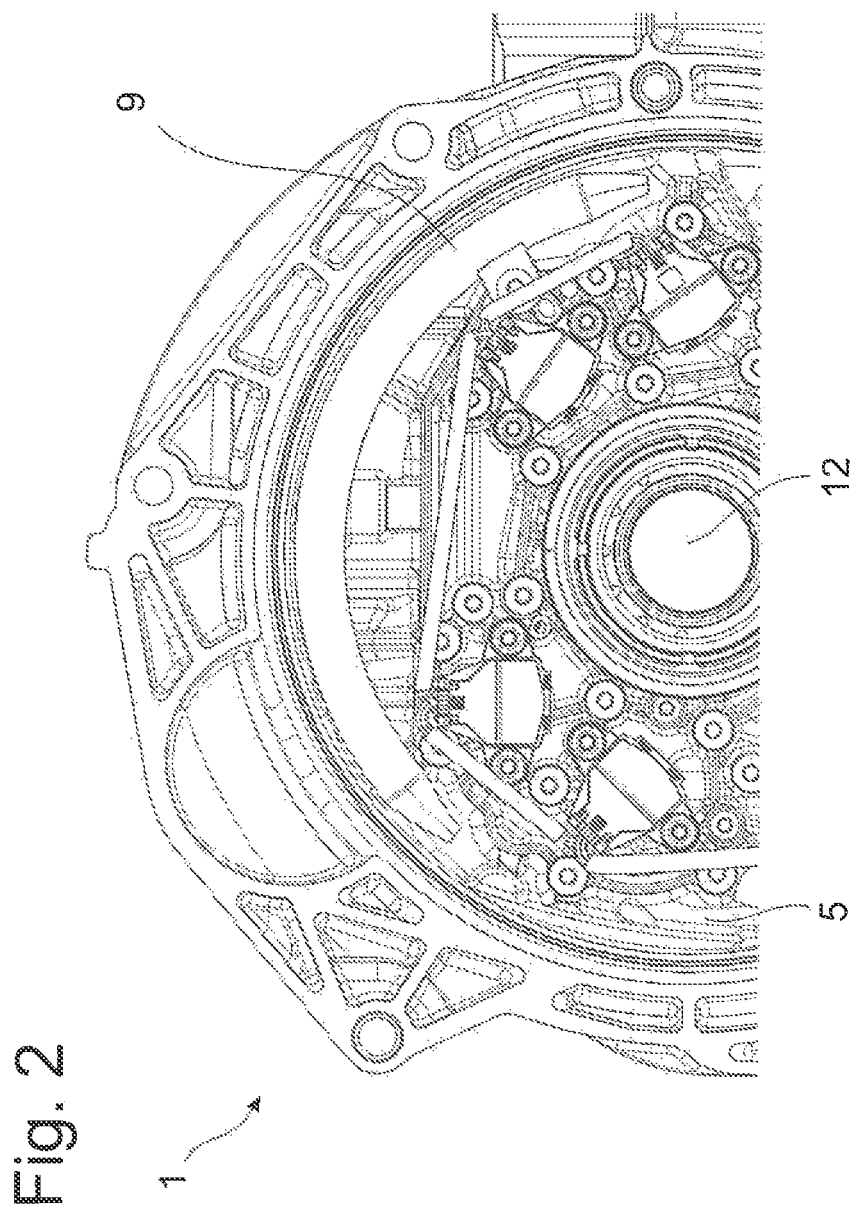
FIG. 2 shows a transmission in a second view.

FIG. 2 shows the transmission housing 1 in a further view, namely in the top view of the intermediate wall 5. The arrangement of the breather element 9 is apparent. The breather element 9 is arranged above the passage opening 12 for the transmission input shafts and, in particular, as far upward as possible.

FIG. 3 shows the breather assembly 7 in a perspective view. On the one hand, the pot shape of the oil collection element 8 as well as its annular configuration are apparent. Moreover, a passage opening 14 for the transmission input shafts is apparent. Multiple bushes 16 for the bolted connection of the oil collection element 8 are present around the passage opening 14.

An O-ring 18 for radial sealing is arranged on the radially outer rim of the oil collection element 8. The O-ring 18 seals the oil collection element 8 with respect to the transmission housing 2 and, more precisely, the clutch bell housing 3.

In addition, the oil collection element 8 includes air passage openings 20, through which air can enter the breather chamber 22. Via the air passage openings 20, oil foam and, possibly, also small amounts of oil spray can also enter the breather chamber 22. The air passage openings 20 are spaced apart from the entry openings 24 of the breather element 9, however, and, in addition, are arranged in such a way that they prevent oil spray from entering the breather element 9.

The breather element 9 is considerably simplified and includes essentially only one base body 26 including two entry openings 24. For the connection toward the outside, the breather element 9 includes a breather duct 28 branching off from the base element 26.

The breather element 9 is annular and is designed as a circular segment. The breather element 9 tapers at the ends 30. In other words, the cross-section of the base body 26 expands downstream from the entry openings 24 towards the breather duct 28. As a result, the oil foam expands, the oil bubbles burst, and the oil foam is separated into oil and air.

FIG. 4 shows the breather assembly 7 from the opposite side as compared to FIG. 3. As a result, it is apparent that the breather element 9 is partitioned off from the transmission interior by the oil collection element 8.

FIG. 5 shows an additional example embodiment of the breather assembly 7 by an oil barrier 32 in the form of a baffle 34. The baffle 34 is pressed-in or integrally injection-molded and protrudes from the breather duct 28 into the base body 26. Since, in this view, the oil of the oil foam moves into or out of the page in the main movement, oil foam located on the inner wall of the base body 26 is prevented from penetrating, due to the baffle 34. Instead, the oil foam must pile up high in the center of the base body 26 so that any oil at all could enter the breather duct 28. This is not the case, due to the oil collection element 8 and the resultant small amounts of oil in the breather element 9. Therefore, a leakage of oil out of the transmission 1 is reliably prevented.

FIG. 6 shows an alternative embodiment of an oil barrier 32 in the form of the baffle 36. The baffle 36 reduces the diameter of the breather duct 28.

The breather duct 28 has been pressed into the intermediate wall 5, as is the case in all other embodiments as well. The breather duct 28 is sealed by an O-ring 38.

The exit opening 40 is located at the end of the breather duct 28 for the connection toward the outside.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 transmission
2 transmission housing
3 clutch bell housing
4 gear set housing
5 intermediate wall
6 clutch assembly
7 breather assembly
8 oil collection element
9 breather element
10 hose connection
12 passage opening
14 passage opening
16 bush
18 O-ring
20 air passage opening
22 breather chamber
24 entry opening
26 base body
28 breather duct
30 end
32 oil retention element
34 baffle
36 baffle
38 O-ring
40 exit opening

The invention claimed is:

1. A dual clutch transmission (1), comprising:
a transmission housing (2);
a breather assembly (7) with a breather element (9) that is discrete from and disposed within the transmission housing (2), the breather element (9) comprising a base body (26) with two entry openings (24) facing a transmission interior and one outwardly facing exit opening (40), the breather element (9) being curved with a circular arc shape, the two entry openings (24) positioned at opposite ends of the circular arc shape of the breather element (9), the one exit opening (40) positioned between the two entry openings (24) along the circular arc shape of the breather element (9), the cross-section of the breather element (9) enlarging, at least in part, from each of two entry openings (24) toward a center of the breather element (9); and at least one oil collection element (8) arranged between the breather element (9) and an oil spray source (6), wherein the breather element (9) is arranged between the oil collection element (8) and a transmission interior wall (5) within the dual clutch transmission (1), and wherein the oil collection element (8) has a closed annular cross-section.

2. The dual clutch transmission (1) of claim 1, wherein the oil collection element (8) is pot-shaped.

3. The dual clutch transmission (1) of claim 1, wherein the oil collection element (8) is constructed of plastic.

4. The dual clutch transmission (1) of claim 1, wherein the oil collection element (8) is positioned to shield the breather element (9) from oil spray.

5. The dual clutch transmission (1) of claim 1, wherein the oil collection element (8) separates a breather chamber (22) from a remainder of the transmission interior.

6. The dual clutch transmission (1) of claim 1, wherein the oil collection element (8) comprises air passage openings (20) in a lower half of the oil collection element (8).

7. The dual clutch transmission (1) of claim 1, wherein the breather element (9) comprises two entry openings (24) and one exit opening (40).

8. The dual clutch transmission (1) of claim 1, wherein the breather element (9) is curved.

9. The dual clutch transmission (1) of claim 1, wherein the breather element (9) has a variable cross-section.

10. The dual clutch transmission (1) of claim 9, wherein the cross-section of the breather element (9) enlarges, at least in part, toward a center of the breather element (9).

11. The dual clutch transmission (1) of claim 1, wherein the at least one entry opening (24) of the breather element (9) faces downwardly.

12. The dual clutch transmission (1) of claim 1, wherein the breather element (9) comprises a breather duct (28) that encompasses the exit opening (40) and is insertable into the transmission interior wall (5).

13. The dual clutch transmission (1) of claim 1, wherein the breather assembly (7) is arranged in a clutch bell housing (3).

14. The dual clutch transmission (1) of claim 1, wherein the transmission interior wall (5) comprises an intermediate wall between a clutch bell housing and a gear set housing.

15. The dual clutch transmission (1) of claim 14, wherein the breather chamber is disposed between the oil collection element and the intermediate wall.

16. The dual clutch transmission (1) of claim 1, wherein the oil collection element defines a central passage opening for receipt of a transmission input shaft.

* * * * *